United States Patent [19]

Copeland et al.

[11] Patent Number: 5,683,064
[45] Date of Patent: Nov. 4, 1997

[54] LOCKING UNIVERSAL SUPPORT ARM

[75] Inventors: Stephan Copeland, New York, N.Y.; Michael McAllister, Harleysville, Pa.

[73] Assignee: Knoll, Inc., East Greenville, Pa.

[21] Appl. No.: 476,813

[22] Filed: Jun. 7, 1995

Related U.S. Application Data

[63] Continuation-in-part of Ser. No. 258,016, Jun. 10, 1994, Pat. No. 5,564,667.

[51] Int. Cl.$^6$ .................................................. F16M 13/00
[52] U.S. Cl. ........................... 248/278.1; 248/288.51; 248/160; 248/918; 403/166
[58] Field of Search ......................... 248/278.1, 276.1, 248/918, 919, 920, 921, 923, 922, 183.1, 184.1, 160, 279.1; 403/183, 166

[56] References Cited

U.S. PATENT DOCUMENTS

| | | | |
|---|---|---|---|
| 870,429 | 11/1907 | Grimler | 248/276.1 X |
| 1,257,837 | 2/1918 | Fowler | 248/278.1 |
| 1,460,697 | 7/1923 | Bendlin | 248/276.1 |
| 2,510,198 | 6/1950 | Tesmer | 248/231.7 |
| 3,096,962 | 7/1963 | Meijs | 248/276.1 |
| 3,168,274 | 2/1965 | Street | 248/276.1 X |
| 3,584,822 | 6/1971 | Oram | 248/276.1 X |
| 3,625,084 | 12/1971 | Low | 74/501 R |
| 3,638,973 | 2/1972 | Poletti | 285/184 |
| 3,903,812 | 9/1975 | Cowley | 108/2 |
| 3,908,560 | 9/1975 | Horner | 108/2 |
| 3,908,561 | 9/1975 | Cowley | 108/6 |
| 4,063,830 | 12/1977 | Ban | 403/166 |
| 4,431,329 | 2/1984 | Baitella | 403/55 |
| 4,632,349 | 12/1986 | Anstey | 248/281.1 |
| 4,913,390 | 4/1990 | Berke | 248/176 |
| 4,964,748 | 10/1990 | McFadden | 403/55 |
| 4,976,407 | 12/1990 | Schwartz et al. | 248/118.3 |
| 5,050,826 | 9/1991 | Johnston | 248/118.3 |
| 5,072,905 | 12/1991 | Hyatt | 248/118 |
| 5,104,073 | 4/1992 | Van Beek et al. | 248/118 |
| 5,147,090 | 9/1992 | Mandell et al. | 248/118.1 |
| 5,158,256 | 10/1992 | Gross | 248/118.3 |
| 5,161,760 | 11/1992 | Terbrack | 248/118 |
| 5,207,791 | 5/1993 | Scherbarth | 273/148 |
| 5,219,136 | 6/1993 | Hassel et al. | 248/118 |
| 5,234,186 | 8/1993 | Powell | 248/118.1 |
| 5,284,130 | 2/1994 | Ratliff | 248/278.1 X |
| 5,348,259 | 9/1994 | Blanco et al. | 248/276.1 |

FOREIGN PATENT DOCUMENTS

| | | |
|---|---|---|
| 0342560 | 11/1989 | European Pat. Off. . |
| 2227278 | 7/1990 | United Kingdom . |
| WO91/14384 | 10/1991 | WIPO . |

*Primary Examiner*—Ramon O. Ramirez
*Attorney, Agent, or Firm*—Buchanan Ingersoll, P.C.

[57] ABSTRACT

A movable support arm positions a surface platform for a keyboard, display monitor, pointing device, wrist support or the like relative to a base structure such as the underside of a desk top. Articulated members between a base member and the platform are coupled by joints having rotational couplings on two mutually perpendicular axes, forming universal joints. The joints have axially facing rotational engagement surfaces that can be splined or otherwise made engageable, and are displaceable toward and away from one another, the latter preferably by a spring coupling that is axially limited in extension. The rotational engagement surfaces resist rotation when engaged. A line such as a cable traverses the joints and normally applies tension via a spring, causing all the joints to lock and to hold the supporting platform at a given position and orientation. A manually operable control is provided to extend the length of the line and disengage all the joints simultaneously, whereupon the support platform can be moved freely to a new position anywhere in a three dimensional range, as well as tilted, etc. The control is released at the new position to again hold the platform in place. The line runs centrally through the joints. A counterbalance spring and line are displaced from the centerline, the cable winding around a horizontal one of the joints to vary tension on the spring for offsetting part of the weight of the support.

7 Claims, 9 Drawing Sheets

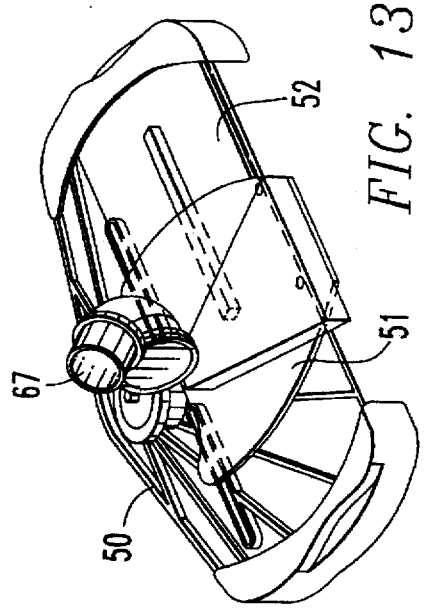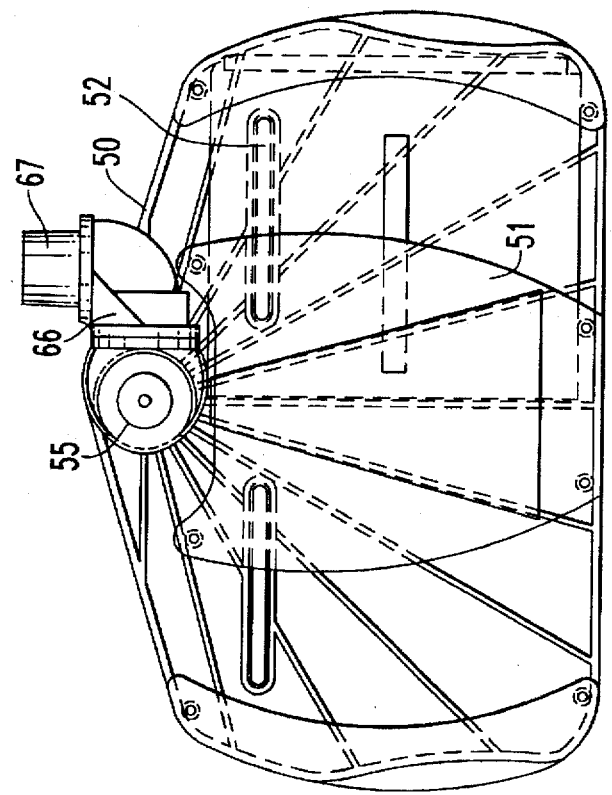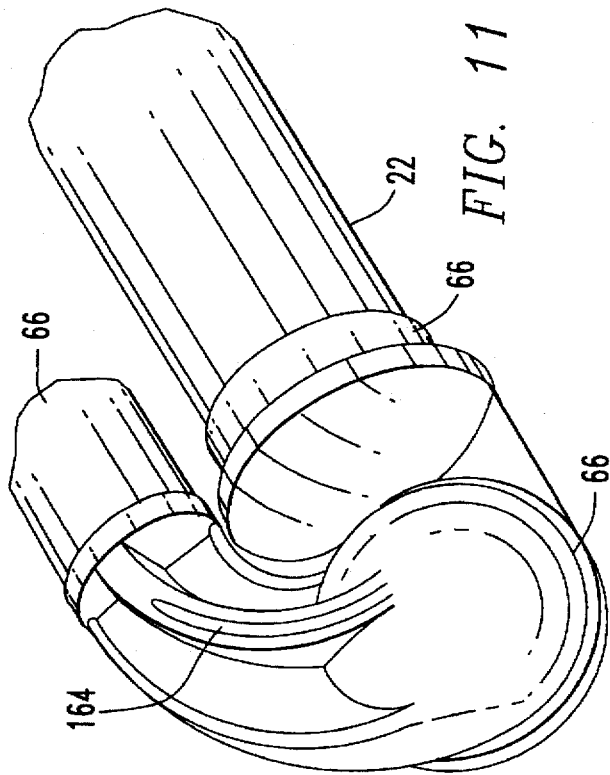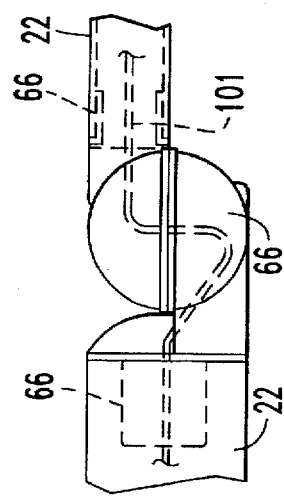

LOCKING UNIVERSAL SUPPORT ARM

CROSS REFERENCE TO RELATED APPLICATION

This is a continuation-in-part of application Ser. No. 08/258,016, filed Jun. 10, 1994 now U.S. Pat. No. 5,564,667.

BACKGROUND OF THE INVENTION

1. Field of the Invention

The invention relates to a manually positionable support device, especially for a work surface, keyboard support or similar support platform. Articulated members are coupled by joints that are releasable via a manual control, such that the user can place the support platform at any desired position and orientation within a range by freely moving it there. When re-engaged, the joints lock and hold the platform at the new position. Preferably, the joints are locked by at least one spring biasing means opposed by the control, and an additional spring biasing means opposes the force of gravity, limiting the tendency for the platform to drop upon release of the joints.

The support device is useful, for example, to position an electronic interface device such as a computer workstation keyboard, monitor, data tablet or the like relative to a desk or other fixed structure, or simply to provide a useful surface for writing, drawing, storage or other purposes.

A slide fitting, and plural rotational joints are provided between a fixed mounting point and the platform, providing various degrees of freedom. The rotational joints include joints having axes at right angles, forming at least one universal joint. The control releases certain of the joints between the support platform and a base part, and preferably other joints remain movable regardless of the state of the control.

The releasable joint elements can have engagement surfaces that are movable toward and away from one another along their axes of rotation, for rotational locking and unlocking, respectively. Tension on a cable or the like normally holds the engagement surfaces axially in abutment and rotationally locked. Tension is released temporarily by a control lever coupled to a cable traversing the joint elements, which frees the joints to rotate for repositioning the support arm.

According to one embodiment, a positive locking mechanism for the cable rigidly fixes the support device at the chosen position when the control lever is released, by a lever arrangement that isolates the cable from spring tension when locked. According to another embodiment the support arm can have a plurality of elongated connecting arms coupled by such joint elements, dimensioned to permit positioning as appropriate for a user who may choose to sit or stand.

As applied in particular to a keyboard or laptop computer support, the device can have limited travel, frictional resistance, and/or spring biasing features such that the platform part of the support is not abruptly dropped upon releasing the joints, for example by a user who is unfamiliar with the device. The support is apt to accommodate different heights, lateral positions and tilts.

2. Prior Art

It is important in a work environment to enable a worker to adapt the environment to his or her individual needs, including by positioning work surfaces or supported devices at a height, distance and orientation desired to best complement the worker's dimensions and preferences. It is also advantageous for reasons of comfort and for minimizing repetitive motion injuries, to enable the position and/or orientation aspects of work surfaces to be changed readily and conveniently. This reduces the need to work for a long time in one position or at one precise location. The worker may desire to change any or all of the positioning aspects of the support from time to time.

Various repositionable structures have been developed for making adjustments in the height, extension, lateral position, orientation and other positional aspects of a support surface relative to a base such as a desk, supporting pedestal, mobile foundation device or other structure. Repositionable structures are useful as supports for electronic interface devices such as keyboards, display monitors, data pads, computer mice or other pointers, and also for desks, drafting tables, ready-access storage bins, etc. As appropriate, the structures may be configured for the specific use, e.g., with wrist supports for using a keyboard, clamps or receptacles for holding down the supported device, an associated support for a pointing device such as a mouse, etc. Typically, the structures have a plurality of arm members that are coupled so as to be relatively movable by sliding or rotation relative to the base structure and one another.

The need for a solid and stable support surface and the need to facilitate repositioning of the surface can be conflicting objectives. Advantageously, the supported device should remain secure and stationary in the chosen position, against forces applied to the device as it is used. Overly flexible joints are undesirable for supporting devices such as keyboards or laptop computers, which must be kept stationary against manually applied forces produced by the user. Overly flexible or resiliently movable joints that permit vertical displacement are particularly undesirable when the support is to bear weight. These considerations recommend strong rigid joints. Conversely, it is undesirable to make a joint difficult to operate by a user who wishes to change the placement, elevation or orientation of the supported device.

In a typical keyboard support, for example, two or more rigid members are articulated at hinge or pivot joints, and means are provided to lock pairs of adjacent articulated members relative to one another against expected forces. It is possible to include springs in such supports for bearing part of the weight on the support when the locking means is released, and thus to make the support seem lighter when it is repositioned. It is also possible to combine some joints that can be locked and others that cannot.

The typical form of locking mechanism for articulated members is frictional. For example, as in U.S. Pat. No. 4,431,329—Baitella, in a hinging joint having axially abutting plates attached to respective arm members, a threaded tightening bolt with a lever handle can be used to urge the plates into frictional engagement. A pivoting lever can be used instead of a bolt and lever to exert axial pressure for example as in U.S. Pat. No. 4,976,407—Schwartz et al. Another alternative for a rotational joint is to use a bolt and lever handle or the like to shorten a split or C-shaped collar circumferentially, as in U.S. Pat. No. 4,964,748—McFadden, thereby exerting radial rather than axial pressure for frictional engagement. Each of these alternatives provides a rigid connection if the frictional engagement is adjusted tightly enough. The extent of friction applied is varied over a continuous range of tightening, rather than switching between locked and unlocked states.

There are drawbacks to such frictional locking mechanisms. If two or more rotational joints each lock individually and independently of the other rotational joints, moving the support to a new position is cumbersome. In the above McFadden patent, two adjacent joints on the opposite ends of an arm can be tightened or loosened simultaneously using a double-ended tightening arrangement, but only in one rotational axis per joint. For a series of rotational joints between articulated members proceeding from a proximal or fixed end to a distal end carrying a work surface, unlocking, moving and relocking each successive joint is tedious. Each rotational joint is loosened after envisioning the positioning effect of this rotational joint on the eventual position of the distal end, then the associated articulated member is moved and the joint is re-tightened. Proceeding, for example, from the proximal end to the distal end, attention is required at each rotation axis of each joint.

A support having a plurality of universal joints between a supporting structure such as a desk, and a support platform for a keyboard or the like, would be advantageous and versatile in that the ultimate position of the support could be arranged at any point in a three dimension span of movement, and at any orientation. Furthermore, articulated connecting arm members of a support arm comprising a number of such joints could be placed in various arrangements even while holding the supporting platform at a given position, providing further versatility. However, the need to individually unlock and re-lock successive joints whenever repositioning the support, effectively rebuilding the support arrangement each time, is unduly complicated.

It is known to provide a universal joint in the form of a ball and socket with an adjustable compression fitting. A ball on one member is affixed in a socket by a collar threaded onto the attached member such that the collar can be tightened to lock the joint frictionally. This is a form of single control applicable to three axes of freedom, but also requires attention to each of the individual joints if a number of joints are provided between the fixed support or base and the repositionable distal platform or the like.

Users of frictionally-fixed supports often do not tighten the-frictional mechanisms to the point that the support is fully rigid. Instead, the joints are tightened until they are firm, but not so tight as to preclude movement of the platform by exertion of sufficient force. A looser coupling allows repositioning without attention to the lever or other tightening device, but also holds the support platform less securely. In a universal joint configuration, which inherently has many degrees of freedom, the difficulty in obtaining sufficient security of attachment is compounded.

For all these reasons, plural joints forming universal joint couplings between articulated members, are not likely candidates for a keyboard support or the like, that a user will want to reposition conveniently and often. According to the present invention, however, a plurality of universal joints are subject to a common control that can substantially disengage a number of joints simultaneously by switching them between locked and unlocked states. Means are provided to avoid abruptly dropping a supported weight when the joints are commonly released. As a result, the user readily can cause the support to become flaccid, reposition the platform anywhere in a range of lateral positions, heights and orientations, then lock the support rigidly at the new position. The result is a superior support device that is particularly apt for supports for keyboards, laptops, monitors and other loads.

SUMMARY OF THE INVENTION

It is an object of the invention to optimize the structure of a support arm having a surface for supporting equipment, by providing a universal joint mechanism supporting the surface at any desired position and angle in a range.

It is also an object to provide a means that readily and temporarily frees a series of joints along an elongated support arm to permit positioning, including joints oriented at right angles to one another to form a universal joint, and locks the joints at whatever position they are set.

It is a further object to provide an improved support for workstation keyboards, monitors and the like, to be supported at a convenient but very easily changed position relative to a base structure such as a desk, pedestal or movable base unit.

It is another object to provide a structure that is rendered rigid by tension and flexible in the absence of tension, that is particularly adapted to the problem of supporting a work surface for a keyboard or the like.

It is still another object to provide a locking mechanism in a device as described, that is feed in a positive locking position when released, by a compound leverage arrangement producing tension in lieu of spring tension.

It is a further object of the invention to employ movable joints and lockable joints at different points along the support, and to limit the movement of certain of the joints by angular stops, frictional couplings, spring biasing or the like.

It is another object of the invention to provide an optimal spring biasing arrangement in a universal joint support, to oppose the force of gravity.

According to an inventive aspect, surface supports are improved by employing at least one, and preferably a series, of universal joints having axially abutting rotational engagement surfaces that are biased by tension to engage, but are readily controllable to separate axially for allowing rotation on mutually perpendicular rotation axes, such that an articulated support structure can go relatively more limp when changing the position and orientation of articulated arm members, and becomes more rigid when the control is deactivated to re-engage the frictional surfaces with the recurrence of tension.

These and other objects and aspects of the invention are provided by a movable support arm that positions a support surface for an electronic interface such as a keyboard, display monitor, pointing device or the like, or simply for a work or storage surface. The support surface is positioned relative to a base structure such as the underside of a desk top, a stationary pedestal or a movable base unit. A series of articulated members between the base member and the platform are coupled by joints having interfitting shafts and sleeves on two mutually perpendicular axes, forming at least one universal joint. The joints have axially facing rotational engagement surfaces that can be engaged to lock the joint or disengaged for rotation. The rotational engagement surfaces can be frictional, provided with complementary axially protruding teeth or splines, or can have radially protruding complementary splines that engage or disengage as a function of the relative axial positions of the engagement surfaces on opposite sides of the joint. The engagement surfaces are displaceable toward and away from one another, preferably being biased to separate by a compressible washer or a spring coupling that biases the engagement surfaces to separate.

A tension means normally pulls together the engagement surfaces of the joints against the bias of the compressible washer or the like. This lutes together the engagement surfaces and prevents relative rotation of the elements coupled at the joint. The tension means can comprise a line such as a cable or chain, traversing one or several joints. This tension line can be coupled to a spring to apply tension and lock the joints, but preferably applies tension via a locking control having a compound leverage arrangement that bears positively against the line in the locking position, and is operable against spring pressure to relieve tension on the line when operated. The tension means causes the joints along the support arm to lock rotationally, and thereby to hold the supporting platform rigidly at a given position.

According to a preferred embodiment, the manually operable locking control includes a lever handle, preferably two centrally pivoted lever handles forming a caliper. The lever or caliper can have a fixed pivot point on the support arm, e.g., under the support surface or platform. A first linkage has a member with an end coupled at a connection point to the line, this member being pivoted at a point movable laterally toward and away from the line by manual action of the associated lever handle to thereby displace the line toward or away from the fixed pivot point. A second linkage similarly has a member with an end coupled at a connection point to a tension spring, the member of the second linkage being pivoted on the lever handle at a point opposite from the fixed pivot point. The connection points for the line and the spring move generally opposite one another as the lever handle pivots on the fixed pivot.

The members of the first and second linkages provide a compound leverage arrangement relative to an operational line including the fixed pivot and the cable. This occurs because the force exerted in the direction of the fixed pivot by or against the cable, or by or against the spring, varies with the extent to which the respective member of the linkage is disposed perpendicular to operational line (where leverage is greatest), or parallel to the operational line (where leverage is least).

Preferably, when the control is in a locking position, the member of the first linkage attached to the cable is at or nearly parallel to the operational line, and the member of the second linkage attached to the spring is at or nearly perpendicular thereto. At that position, spring force holding the control in the locked position is greatest. However, the spring force is isolated from the cable because tension on the cable is borne substantially completely by compression of the linkage of the first member. When the control is moved manually to the unlocking position, the user's leverage against the spring increases from an initial minimum in the locking position to a maximum when the control is unlocked and tension on the cable is released. The control thus is relatively easy to operate and when locked provides a rigid and positive application of tension against the cable.

The control and tension line increase or decrease the distance between coupled joint members along the support arm. When tension is released, the axial bias between the controllably lockable joints causes the engagement surfaces to separate. This frees all the controllable joints simultaneously. The support platform then can be moved to a new position anywhere in a three dimensional range, as well as tilted, etc. The control is released at the new position to again hold the platform rigidly in place.

Not all the joints between the base and the support platform need to be controllable. One embodiment that is particularly adapted for supporting a workstation keyboard or laptop computer at a selected position relative to a desktop, includes two controllable universal joints, a frictional slide fitting for moving the support forward or back relative to the front edge of the desktop, and a frictional rotational coupling at the platform.

The slide fitting is coupled to a base stub member long enough to extend beyond the front edge of the desktop, at least when the slide fitting is pulled forward. This base stub member is coupled to a proximal rotation joint (the "base joint") that in an embodiment for mounting under a desktop has a horizontal axis. In addition to sliding, the base stub member can be rotatable on a vertical axis relative to the slide fitting. The base stub member is attached by a sleeve or tube, the length of which provides a range of vertical displacement of the support. The sleeve leads to a head joint on a proximal side of a head member, the head joint having a rotation axis perpendicular to that of the base joint (i.e., around the longitudinal axis of the sleeve). The head member forms a right angle or elbow and on its distal side is coupled via a rotational end joint to the support platform, again at right angles to the head joint. Finally, the support platform comprises an additional rotational joint (the "pivot joint"), perpendicular to the next preceding joint with the head member.

The successive joints are disposed at right angles to one another leading from the base to the platform, forming a plurality of universal joints between articulated members. The longest of the members is preferably the sleeve. The slide fitting for the base stub member has a track that can be fixed on the underside of a horizontal desktop, on a vertical surface, etc., and allows the support to be pulled out or pushed back as a whole. The slide fitting can rotate on its carriage, perpendicular to the sliding direction around an axis normal to the mounting surface, e.g., a vertical line if mounted under a horizontal desktop. In that case the sleeve is rotatable around the axis of the stub member, generally raising or lowering the head joint and the platform thereon. The head joint is rotatable around the axis of the sleeve, thereby adjusting the extent to which the platform is inclined forwardly toward the user. The end joint permits the platform to be tilted laterally, and the final pivot joint permits the platform to be pivoted to bring either lateral corner closer to the user.

The rotational joint at one or both ends of the sleeve member (at the base stub and preferably at the head joint) is temporarily releasable for free rotation. The succession of rotational joints forms a plurality of universal joints, at least one of which is controllable. Preferably, others of the joints are simply frictional, and can include devices for adjusting the friction. For example, movement of the base stub member relative to the desktop or the like can be frictional, and pivoting of the platform relative to the head joint can be frictional. Assuming that the remaining joints are all controllable, the height, lateral tilt and forward tilt of the platform are subject to release by operation of the control, and re-engagement thereafter.

Preferably, the rotational engagement surfaces face axially toward one another and are engaged with application of tension and disengaged with release of tension. Other specific arrangements are also possible, for example with other cable arrangements or other tension varying means such as a pneumatic action for controllably locking and unlocking the respective rotational couplings. The controllable mechanism can comprise means to extend a tension spring or to compress a compression spring. The line can traverse a subset of the joints, and some of the joints can be controllable while others are not.

Preferably, the line is arranged to pass centrally through each joint of a series of universal joints, i.e., along their respective rotation axes. This prevents tension on the line from leading to angular deflection of the joints and makes the repositioning action very free and smooth. In a preferred embodiment, the line traverses the rotational joint at the platform that it does not influence. The line can be coupled, for example, to a fixed point on a proximal section of the connecting arms (e.g., at the base stub member). One or several connecting arms or sleeves can lead to the platform support at the distal end.

Preferably, the rotational displacement of the joints defines a substantial range, but the joints traversed by the control cable are limited against turning fully through 360°, so the cable cannot be wound up. The slide joint at the proximal end of the arm and the pivot joint with the platform are not influenced by the controllable locking mechanism, and preferably are simply snugly attached such that they can be manipulated against inherent friction.

At least one connecting arm section with universal joints at opposite ends is provided. In embodiments having two or more connecting arm sections, not only are the position and orientation of the platform subject to movement and locking, but the positions of the connecting arm sections relative to one another can be varied even assuming a given platform position and orientation. Accordingly, the arm sections can be kept out of the way under the desk top, or extended substantially, for example to permit a keyboard to be positioned for use by a person who is either sitting or standing. For compact storage of the connecting arms, an embodiment is provided wherein adjacent connecting arm sections are coupled by a universal joint with a curve that enables the connected section to be mined opposite one another substantially by 180°.

A number of additional aspects of the invention will be apparent from the following description of specific preferred examples by which the invention can be embodied.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 11 is a side elevation view of an alternative embodiment having a joint with an offset profile.

FIG. 12 is elevation view of the embodiment according to FIG. 11, showing routing of the cable through the rotational centers.

FIG. 13 is a perspective view of a support platform according to the invention, as seen from below.

FIG. 14 is a bottom plan view of the platform of FIG. 13, showing a joint having three mutually perpendicular rotation axes.

DETAILED DESCRIPTION OF THE PREFERRED EMBODIMENTS

Figure 1:
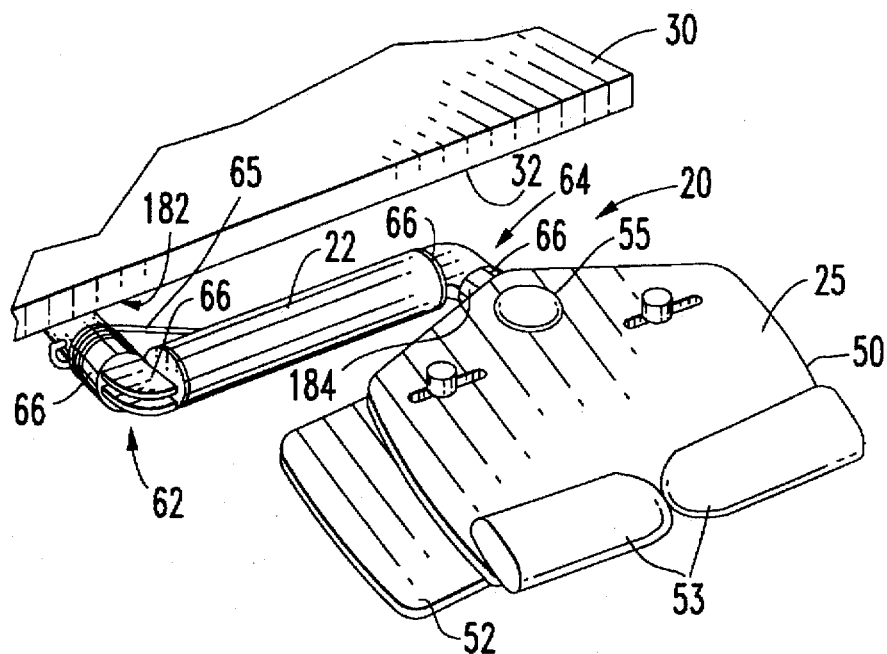
FIG. 1 is a perspective illustration of a support arm for movably positioning a work surface relative to a base structure, according to the invention.
Figure 2:
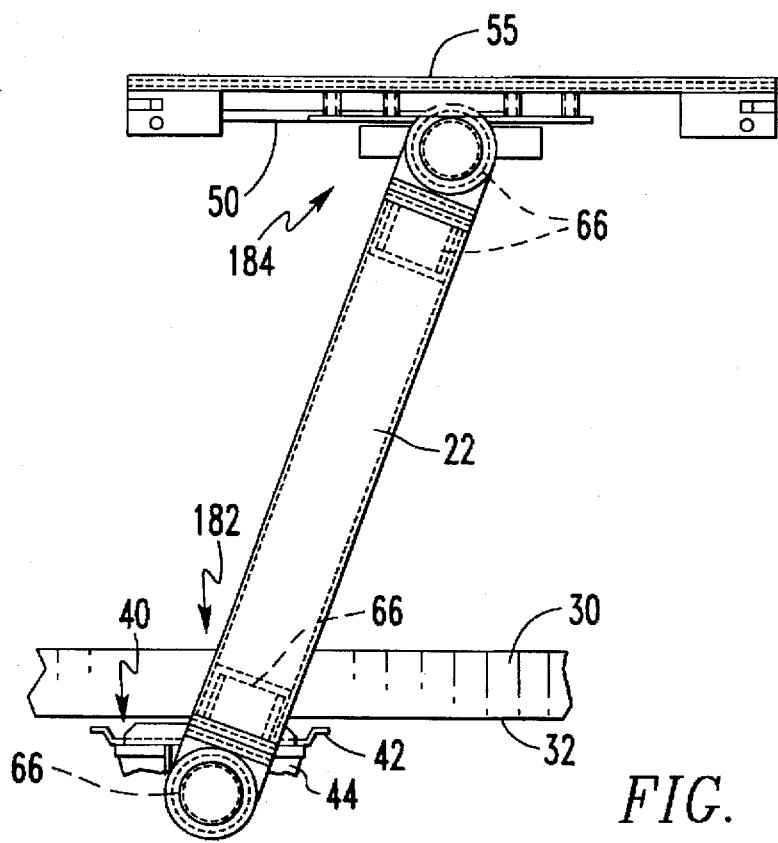
FIG. 2 is a front elevation of the support arm of FIG. 1.
Figure 3:
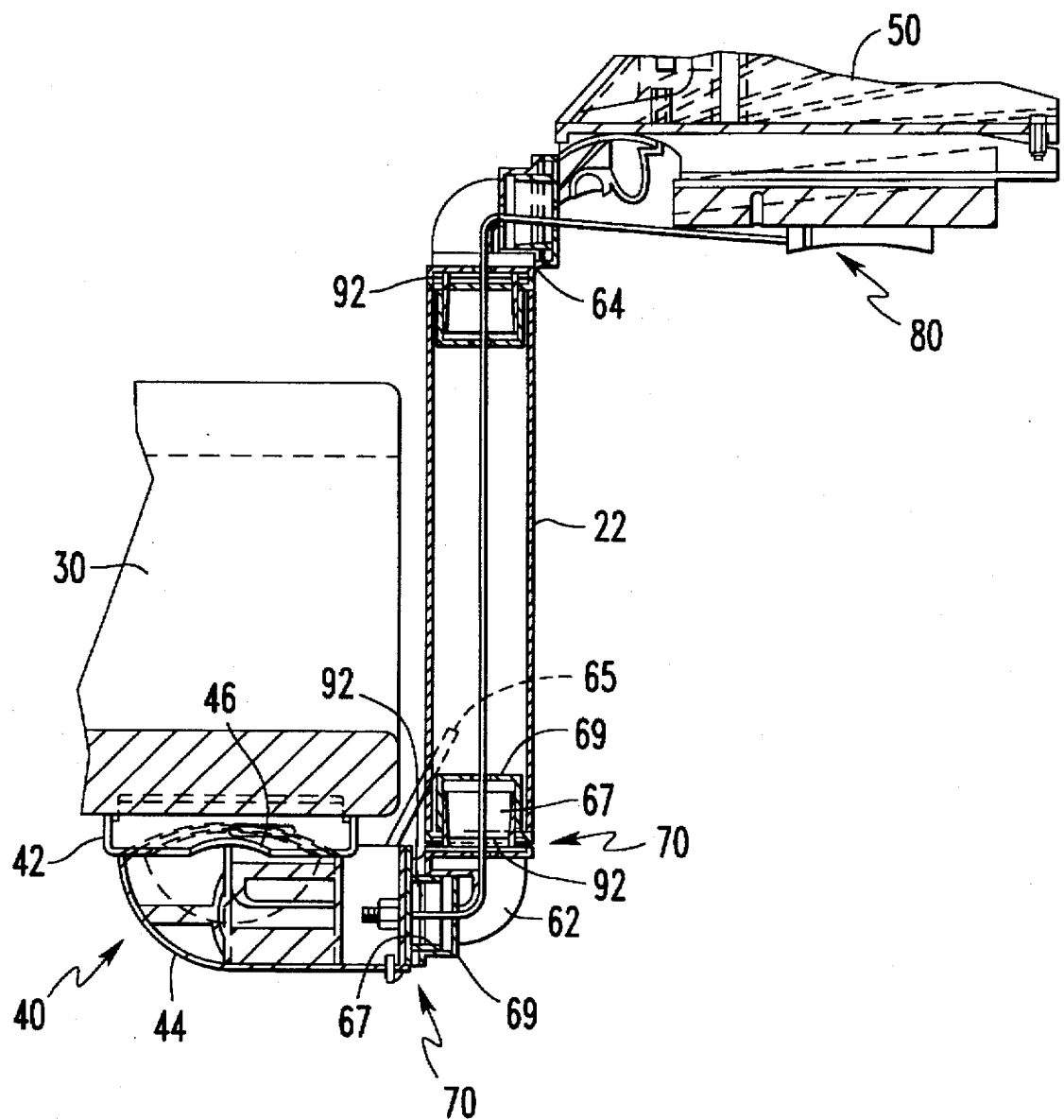
FIG. 3 is a side elevation thereof, partly in section.

A support arm 20 according to a first embodiment of the invention is shown in FIGS. 1–3, for movably positioning a work surface 25 relative to a base structure 30. The work surface can be arranged to support various items or simply to provide an available surface on which to work. The illustrated embodiment is configured to support an electronic interface device such as the keyboard of a computer work station, typically coupled to a processor on the base structure via a flexible cable that can be run along support arm 20 (only arm 20 and base structure 30 being shown). Support arm 20 movably positions work surface 25 relative to the base structure, being mounted to the horizontal underside 32 of a table top, desk top or the like. The support arm also could be attached to a vertical or other surface, to a floor mounted base unit, or to a movable base unit provided with sufficient ballast. Whereas mounting such a support under a horizontal desk top is the typical application of the support, terms such as "vertical" and "horizontal" as used to describe such an application are not to be construed as limiting the invention to such a mounting.

Support arm 20 is intended to permit a user to reposition and/or orient work surface 25 anywhere within a three dimensional range of movement defined by a series of articulated members coupled by joints.

In the embodiment shown in FIGS. 1–3, a base member 40 is attachable as shown in FIGS. 2 and 3 to the underside 32 of the desk top or other base structure 30. Several variations for base member 40 are described herein and shown in the drawings, wherein the same reference numbers are used throughout to identify corresponding structures of the respective embodiments. Base member 40 preferably provides for a rotational displacement around a vertical axis, a horizontal axis, or can be arranged to provide a linear displacement to permit the support arm and supported keyboard or other article to be pulled out for use or stored, for example under a desk top. Combinations of these alternatives are also possible.

Base member 40 has a portion 42 that is directly attached to the underside 32 of base structure 30, for example being affixed by screws, and a carriage portion 44 that is movable relative to the attached portion 42. For example, portions 42, 44 can comprise a pin/slot arrangement 46, wherein a pin on one of the portions 42, 44 is slidable in a slot in the other. Thus, base member 40 forms a joint that is rotatable around the axis of the pin, and the axis can be relocated by moving the pin along the slot. The slot can be arranged perpendicular to the edge of the desk top or support, parallel to the edge, or at another angle (e.g., diagonal), to provide the desired range of displacement.

In the example as shown for supporting a keyboard, a platform 50 defines the work surface 25 and preferably is dimensioned to exceed the size or footprint of the keyboard or the like to be carried on the platform. Platform 50 can include attachment devices, clamps or sockets, stops or the like that engage the device to be carried, which is helpful because the orientation of the platform can be changed manually, including tilting forward or laterally relative to a user. The platform can include additional devices such as one or more supplemental shelves that attach to and preferably slide under the platform or can be pulled out, e.g., to provide room near the keyboard for operating a mouse, trackball or other pointing device. Movable or adjustable features such as slots for repositioning the stops, movable wrist supports or the like can be included as well.

At least one connecting arm 22 is disposed between the base member 40 and the platform 50, and at least one joint 62, 64, coupling the connecting arm 22 to one of the base member 40 and the platform 50, has rotatable couplings 66. In the embodiment of FIGS. 1–3, rotatable couplings are provided at both ends, namely between the connecting arm 22 and the base member 40, and between the connecting arm 22 and the platform 50. Each of these couplings 66 is either rotationally locked or is freely rotatable, depending on the operation of a locking means that is discussed in detail below.

Connecting arm 22 can be longer or shorter, depending on the particular embodiment of the support. Likewise, the extensions of the stubs of the joints (i.e., the distance between the respective axis of rotation and the end of the adjacent connecting arm) can be longer or shorter. In the embodiment of FIGS. 1–3, connecting arm 22 is about sixteen inches (41 cm) in length and the stub length from the pin/slot rotation axis to the longitudinal axis of connecting arm 22 is about four inches (10 cm). Connecting arm 22 preferably can be moved upwardly past the edge of the desk or table 30. Accordingly, the from end of the pin/slot travel is mounted close enough to the edge of the desk 30 to provide clearance.

The range of rotation of the respective joints 62, 64 need not be 360°, depending on the particular use of the support.

For example, in the embodiment as shown in FIGS. 1 and 2, proximal joint 62 is to the left of platform 50 at desk top height and can rotate up, e.g., for the convenience of a standing user. It may be sufficient in those circumstances to enable arm 22 to rotate only up to vertical, and a suitable rotational stop abutment (not shown in FIGS. 1–3) can be provided in the horizontal rotation axis of joint 62. This does not restrict the support operationally, but prevents the support from being wound around repeatedly in the same direction, which could affect the tension applied by the control means as discussed below.

As shown in FIG. 1, one or more of the joints 62, 64 can be provided with a spring red or similar resilient counterbalancing means bridging across the joint to provide a home position, or at least to bear a part of the weight of the support. In FIG. 1, a spring rod 65 is attached to the proximal side of proximal joint 62, for example with the spring rod wrapped around the proximal stub of joint 62 and having a spring end that protrudes radially inwardly into a hole in the stub. The opposite end of the spring rod extends substantially horizontally at rest and is disposed under connecting arm 22.

An alternative embodiment for a spring counterbalance is discussed below with respect to FIGS. 25–28. When the user releases the support arm, the spring can bear all or part of the weight of the platform and connecting rod, such that the platform cannot drop inadvertently when the support arm is released, and preferably the counterbalance is sufficient substantially to offset the weight of the support, but not the weight of any load on the support, which is comfortable when repositioning the support.

The spring rod in FIGS. 1 and 2 can simply rest under connecting arm 22, such that arm 22 can be lifted away, or can be attached to arm 22. If attached to arm 22, the point of attachment can be variable, for example by capturing the spring rod under a sliding collar, for varying the resilience of the spring rod.

Joints 62, 64 each provide for at least some rotational movement along two mutually perpendicular axes, thus substantially forming a universal joint. In addition, platform 50 is coupled to the endmost stub of the distal joint 64 via a rotational coupling having a rotation axis perpendicular to the plane of platform 50. Joints 62, 64 include two rotational cylinder and sleeve configurations, with in each case a male cylindrical part 67 on one side fitting rotatably into a female cylindrical part 69 on the other side. Thus, the embodiment of FIGS. 1–3 has a number of degrees of freedom, including: translation of arm 20 relative to desk 30 via the pin/slot 46; rotation of base member 40 about the pin; rotation of connecting arm 22 about a horizontal axis corresponding to the stub part of base member 40 (a circular arc in FIG. 2); relative rotation at the proximal or distal end of connecting arm 22; rotation around the distal stub of distal joint 64 (lateral tilting of platform 50 in FIG. 3); and rotation of platform 50 about an axis perpendicular to its plane.

Rotational couplings 66 for rotation around the axis of connecting arm 22, are provided at both ends of connecting arm 22. These are to some extent redundant, and one can be eliminated as discussed with respect to FIGS. 25–28, but can be included so that it is not necessary to rotate connecting arm 22 in any particular direction when repositioning platform 50 where desired, which would be necessary if connecting arm 22 was rotationally fixed to the stub of one of the proximal and distal joints 62, 64. Instead, in this embodiment, universal joints having rotatable couplings 66 for mutually perpendicular rotation axes are provided at both ends.

Figure 4:
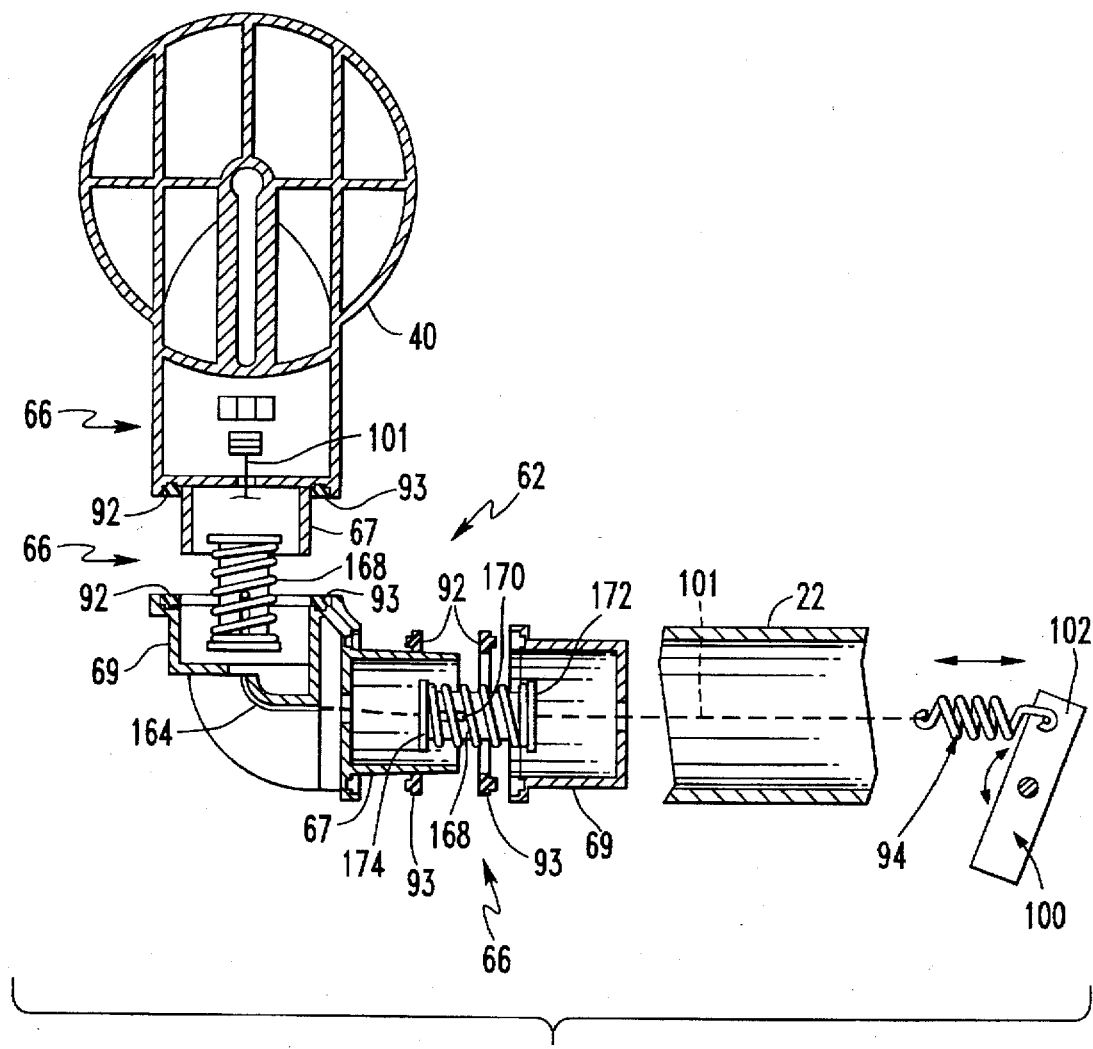
FIG. 4 is an exploded perspective view showing one embodiment of a locking joint, namely the proximal joint.

With its many degrees of freedom, support arm 20 is quite versatile with respect to the possible positions in which platform 50 can be disposed, within a range of positions and orientations permitted by the respective couplings. However, locking means 70, an embodiment of which is shown in FIG. 4, is normally active to lock at least a subset of the joints that couple platform 50 to the desk top or other base structure 30. Locking means 70 causes the rotatable couplings 66 to engage, i.e., to become rotationally fixed, thereby maintaining whatever angular relationship then exists at the respective joints, namely between the connecting arm 22, base member 40 and the platform 50. In this manner, the position and orientation of platform 50 is fixed and stable for working.

Locking means 70 preferably acts on both mutually perpendicular rotational couplings 66 at the proximal and distal joints 62, 64. It is less critical to lock pin/slot joint 46 (against translation or rotation) and the joint 55, aligned perpendicular to the plane of platform 50. These joints are not subjected to forces in regular use that would tend to cause the position and orientation of platform 50 to change. Accordingly, joints 46, 55 can be relatively free, for example being frictionally snug but relatively easily overcome to cause rotation or displacement.

Locking means 70 is coupled to a manually operable control means 80, for simultaneously releasing the locking means in each of the locked axes of rotation, thus causing support arm 20 to go flaccid, whereupon platform 50 is movable to any desired position and orientation in the range of movement provided. When locking means 70 is re-engaged, the controlled joints 62, 64 become rotationally locked as to each of their rotation axes, and support arm 20 becomes rigid to support platform 50 at its new position.

In the embodiment of the invention shown in FIG. 4, locking means 70 includes relatively movable rotational engagement surfaces 92, that are fixed on the relatively rotatable parts of each rotatable coupling 66 and can be placed in abutment or engagement to prevent rotation or spaced slightly from one another to permit rotation. For example, engagement surfaces 92 can face one another axially along each of the two axes, and be provided with means 94 that applies tension to draw the engagement surfaces 92 axially together, and means 100 that relieves the tension to allow relative rotation between the connecting arm 22 and either one of the base member 40 and the platform 50.

There are several possible arrangements for the rotational engagement surfaces. These surfaces can be frictional, can be provided with complementary axially protruding teeth or splines, or can have radially protruding complementary splines. The engagement surfaces adapted to resist rotation when abutted can be formed directly in the joint members or provided by inserted means such as annular rings as shown in FIG. 4, which are rotationally fixed to their respective side of the joint.

Figure 9:
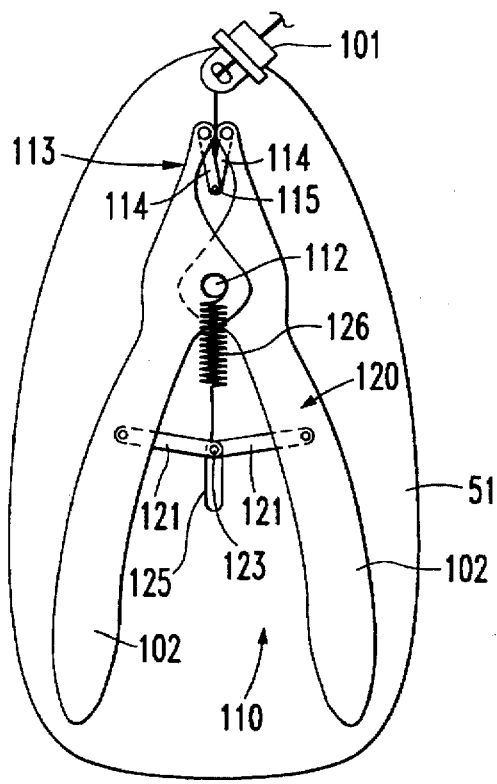
FIGS. 9 and 10 are plan views showing a preferred caliper arrangement for selectively rendering the support rigid or flaccid, respectively.
Figure 10:
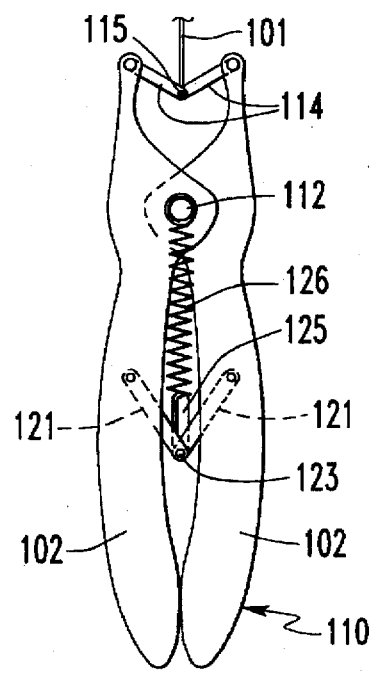

In the embodiment of FIG. 4, the means for applying tension is shown schematically to comprise a cable or line 101 that is loaded by a spring 94 to apply tension, and a lever means 102 is coupled to the line controllably to oppose the spring and thereby release tension on the line. Line 101 runs through the joint 62, 64, as explained more fully hereinafter, to effect this controllable tension. A preferred tension control is shown in FIGS. 9 and 10, comprising a spring connected to a linkage providing compound leverage and a cam-like positive lock in the closed position, and is discussed in detail below.

In FIG. 4, the tension control line can be controlled by a lever 102 coupled to the line, preferably at a point closer than joints 62, 64 to the spring 94 or other means to apply tension that is also coupled to the line, but also potentially at the end of the spring opposite the line. The lever 102 or the like can be disposed proximally or distally of joints 62, 64, but is advantageously placed at the distal end, where it can be operated while grasping the platform.

Figure 5:
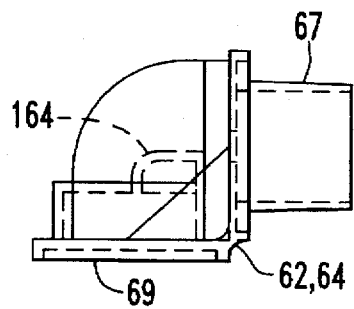
FIG. 5 is an elevation view showing a joint member, e.g., for the proximal or distal joint.
Figure 6:
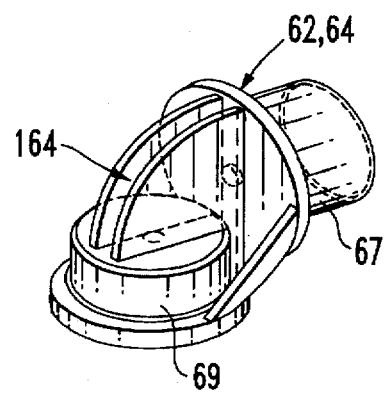
FIG. 6 is a perspective view of a two dimensional rotational coupling.
Figure 7:
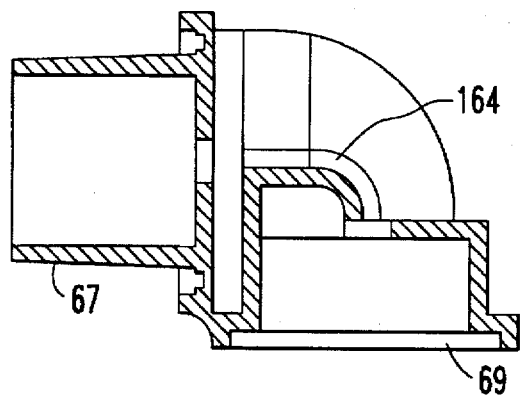
FIG. 7 is a sectional view of the joint part of FIG. 6.

One particular structure for joints 62, 64 is shown in FIG. 4 in an exploded view, and in FIGS. 5–7. Although the stub structures of the different alternative embodiments for joints 62, 64 are somewhat different, the rotational locking and unlocking structures can be alike. The joint members generally define a right angle such that the two rotation axes are perpendicular to one another as needed in a universal joint. The joint member of FIGS. 5–7 has a short elbow between a male part 67 and female part 69. It is also advantageous in certain instances to provide an offset in a joint element, as discussed below with reference to FIG. 11. In FIGS. 5–7, each elbow or joint member has a male part and a female part, and in FIGS. 1–3 the ends of connecting arm 22 are both female. It would likewise be possible to make both ends of the joint member male or both female, or otherwise to vary the specific gender of the couplings, provided of course that the interfitting stub parts were configured in a complementary manner.

The exploded view of FIG. 4 shows an inventive aspect wherein friction surfaces 92 are provided on annular plates 93, arranged to bear axially against one another under tension from line 101. Annular plates 93 are rotationally fixed relative to their respective male or female coupling parts 67, 69, for example by interengaging patterns of axially protruding pins and holes on the annular plates 93 and the coupling parts 67, 69. Alternatively, plates 93 can be riveted, welded or attached by screws.

On the axially facing surfaces of annular plates 93, friction surfaces 92 provide a means by which the facing annular plates 93 are rotationally fixed to one another. For example, the friction surfaces 92 can be formed by a series of axially protruding radially elongated grooves, splines or the like, which fit into corresponding grooves, splines, etc. on the opposed annular plate 93. Resilient means 168 preferably are interspersed between the interconnected male and female coupling parts 67, 69, and urge friction surfaces 92 axially apart. The resilient means 168 is normally loaded by line 101, which applies tension such that the friction surfaces 92 are normally in contact and arm 20 is rigid. When tension is released, resilient means 168 slightly spaces annular plates 93 apart, and the couplings 66 are free to rotate.

Figure 23:
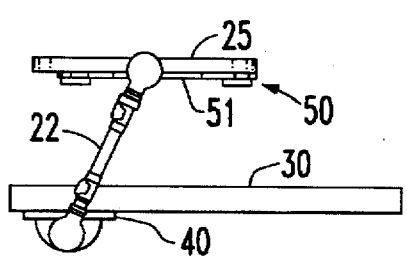
FIG. 23 is a front elevation view of the device as positioned in FIG. 22.

Only a minimal distance of axial displacement preferably is needed to rotationally disengage facing plates 93. For example, the splines or grooves in plates 93 can be about $\frac{1}{16}$ inch (1.6 mm) in depth, this amount of axial displacement being provided by the resilient means in each joint. Resilient means 168 can be, for example, a compressible washer such as a waved or domed washer (shown in FIGS. 23 and 24). In a preferred arrangement the resilient means for separating the engagement surfaces comprises a waved spring, wound helically in two or more loops wherein waves in the spring material are opposed to provide a resilient axially compressible structure. A compressible washer or wave spring of this type has a sufficient range to separate the facing plates 93 upon relaxation of the tension means, and has the advantage that its maximum spacing is limited.

Limiting the maximum opening displacement of the engagement surfaces of each rotational coupling is helpful so that one or more joints along a series of joints that have relatively stronger resilient means 168 cannot take up most of the displacement of the control cable, while other (weaker) resilient means 168 remain compressed and their rotational couplings to remain locked.

Figure 8:
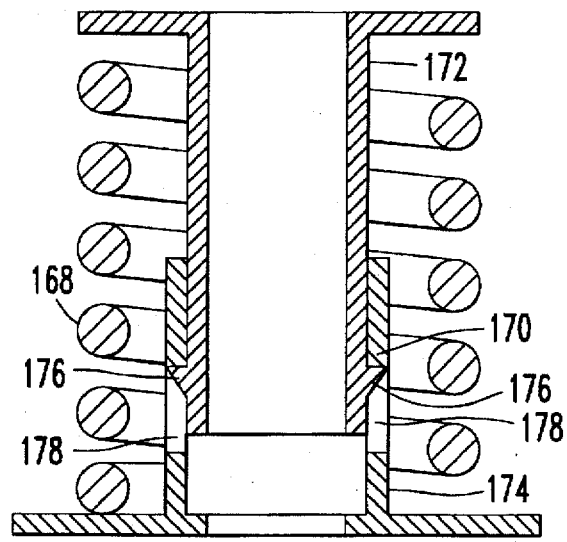
FIG. 8 is a sectional view of a spring part for biasing open the rotational couplings of a joint as in FIGS. 6 and 7.

FIG. 8 shows an alternative means by which the axial opening displacement of a rotational coupling can be limited, in connection with a helical spring. According to this embodiment, resilient means 168 has a pair of telescoping tubes 172, 174, that are urged apart by a helical compression spring that bears outwardly against the flanged ends of tubes 172, 174. Tubes 172, 174 are placed within the space between the male and female parts 67, 69 of rotational couplings 66, as shown in FIG. 4. A stop structure 170, shown in FIG. 8, limits the extent to which the spring can force tubes 172, 174 apart. Tube 172 is provided with radially protruding axial stop pins 176 that interact with axially elongated slots 178 in mating tube 174. Tubes 172, 174 can be snapped together in the compression spring, which bears outwardly on the flanges (and against male and female rotatable joint parts 67, 69), with the axial separation being limited as pins 176 reach the ends of slots 178.

Preferably, the resilient means 168 simply comprises a compressible domed or waved washer, extensible to a distance just sufficient to separate the friction surfaces 92 of the joints 62, 64. The control recaps provides sufficient slack in cable 101 to exceed the sum of the opening displacements of each of the controlled rotational couplings traversed by cable 101. In the embodiment shown, cable or line 101 traverses four rotatable couplings 66, each preferably having a resilient means 168 therein. Assuming a 1/16 inch (1.6 mm) depth contour in the rotational engagement surfaces 92, the tension relief on line 101 needs at least 1/4 inch (6.4 mm) of travel, and preferably has about 3/8 inch (9.6 mm) of travel. The tendency for the tension relief line or cable 101 to distribute the slack that is provided by control means 80 unevenly among joints 66 is thus prevented by resilient means 168 and no one joint remains too tight or too loose. Furthermore, undue slack is avoided all along line 101, minimizing any danger of kinking of line 101.

Another inventive aspect that prevents kinking and is shown in FIGS. 5–7 is the line guide 164 provided by the structure of the joint members along internal surfaces passing around the right angle or elbow. Line guide 164 traces substantially a smooth arc causing line 101 to extend smoothly to and through the center of each joint 66. The line guide is formed as a semi-cylindrical channel along the inside wall of the elbow, being formed between reinforcing sidewalls that extend between the male and female cylindrical parts 67, 69 of the joint. Should excess slack occur in cable 101, the channel depth of guide 164 keeps the cable in place between the channel walls.

Male and female coupling parts 67, 69 have been described as cylindrical, and in the embodiments shown are substantially cylindrical. They can also be at least somewhat conical, or shaped in other particular ways that permit relative rotation. According to a preferred embodiment, coupling parts 67, 69 are slightly conical, for example having sidewalls disposed at about 1° to a line parallel to the respective rotation axis. Thus tension on line 101 tending to shorten the overall length defined by the serially coupled joints 62, 64 has the further effect of more snugly engaging together the adjacent interconnected parts 67, 69. This improves the stability of support arm 20.

In the embodiment shown in FIG. 4, line 101 is attached to support arm 20 at the proximal side of proximal joint 101, and extends through joints 62, 64 to the distal side of distal joint 64. The point of attachment can have a threaded bolt attached to line 101, used to adjust the extent of tension exerted by the spring means 94. On the distal side in the embodiment shown in FIG. 4, the line is attached to an extension spring 94, which applies tension. Control means 80 is operable to further extend spring 126 when releasing tension on line 101, and can comprise a pivotable lever mounted to platform 50 for this purpose.

According to FIG. 4, spring 94 exerts the ultimate tension for locking the rotational couplings. This has the disadvantage that sufficient pressure on platform 50 can cause spring 94 to extend and release one or more of the rotational couplings. FIGS. 9 and 10 illustrate a preferred embodiment wherein a mechanism is provided whose operation is biased by a spring 126 into the locking position, but in the locking position the tension on the cable 101 is rigidly clamped. Furthermore, this is accomplished using a linkage mechanism that provides compound leverage tending to exert greater force holding the locking means closed when in the locking position, and greater force for displacing spring 126 when moved toward the open or unlocking position.

Referring to FIGS. 9 and 10, the manually operable locking control includes at least one lever handle 102, and preferably two lever handles 102 coupled to form a caliper 110 that can be operated with one hand. The caliper is fixed, for example, on the underside of the support platform on its hinge pin 112, enabling the user to manipulate platform 50 while grasping and operating caliper 110 to disengage the respective joints.

A first linkage 114 has at least one, and preferably two symmetrically arranged members 114. One end of member 114 is coupled at a connection point 115 to line 101, member 114 also being pivoted on the associated lever handle at a point that is movable laterally toward and away from the line by the manual action of pivoting the lever handle around fixed pivot 112.

In the caliper arrangement shown, two members 114 are pivoted to the opposite levers 102 of caliper 110. If only one lever is used, it is necessary to guide connection point 115, for example using a pin in a slot (not shown) or a similar means that causes connection point 115 with line 101 to be displaced toward or away from the fixed pivot 112. In the dihedral caliper arrangement shown, the two members 114 of first linkage 113 inherently move along the operational line defined along the centerline of caliper 110. However, it is necessary that linkage members 114 be retained against moving farther toward line 101 than a position in which they are aligned parallel, e.g., via a spring or the like (not shown), so that connection point 115 moves toward fixed pivot 112 for locking and not toward line 101.

A second linkage 120 is coupled to the caliper legs or levers 102 on the opposite side of fixed pivot 112 from first linkage 113. Second linkage 120 similarly has at least one member 121, and preferably two centrally pivoted members 121 as shown. Members 121 of second linkage 120 are pivoted to caliper legs 102 and to one another at a connection point 123 coupled to one end of tension spring 126, whose opposite end is coupled to a fixed point, preferably fixed pivot 112.

First and second linkages 113, 120 are on opposite sides of the fixed pivot point and in the embodiment shown operate in opposite directions as caliper legs 102 are moved relative to one another. The distance between fixed pivot 112 and the first and second linkages 113, 120, as well as the length of members 114 and 121 are such as to provide somewhat greater travel for spring connection point 123 than for cable connection point 115, the latter moving about ⅜ inch (9.6 mm) in the example shown.

Caliper 110 tends to stay aligned with cable 101 when locked as shown in FIG. 9, due to the tension exerted between point 115 and the point at which cable 101 is guided, preferably centrally, through the frictional pivot coupling 55 with platform 50. When unlocked as in FIG. 10, caliper 110 could become misaligned, thereby exerting tension on line 101 or causing members 114 of the front linkage 113 to pass their point of parallel alignment. To keep caliper 110 aligned to the path of cable 101, a pin at either or both of connection point 115 and connection point 123 protrudes into a guide slot in the mounting area aligned to the cable and to fixed pivot 112. In the embodiment shown, slot 125 guides a pin at connection point 115.

The members 114, 121 of the first and second linkages 113, 120 provide a compound leverage arrangement relative to the operational line including fixed pivot 112 and cable 101. This occurs because the force exerted in the direction of fixed pivot 112 by or against cable 101, or by or against the spring 126, varies with the extent to which the respective member 114, 121 is disposed perpendicular to the operational line or parallel to the operational line. Leverage is greatest at second linkage 120, for example, in FIG. 9, because members 121 are nearly in parallel alignment. In this manner, the closing force exerted by spring 126 is greatest when the caliper is closed and the support arm is locked.

In FIG. 9, the force of spring 126 is not applied substantially to cable 101, because members 114 of first linkage 113 are folded nearly parallel to the operational line, effectively isolating the closing force of spring 126 from cable 101. Nevertheless, the control rigidly clamps tension on cable 101, bearing such tension as compression along the length of members 114. In this manner, the caliper acts is functionally similar to a bale or cam lock.

When the control is moved manually to the unlocking position by squeezing together the free ends of caliper legs 102 as in FIG. 10, the leverage of the user's manual squeezing force as applied against spring 126 increases from an initial minimum in the locking position of FIG. 9, where the spring exerts its maximum force, to a position where the user has more mechanical advantage and the spring has less, as shown in FIG. 10. The control is unlocked, tension on the cable is released, and the control is relatively easy to hold open.

The control extends the length of the line traversing the joints to release tension. This disengages all the axially displaceable rotational engagement surfaces and frees the joints simultaneously. Support platform 50 can be moved freely to a new position anywhere in a three dimensional range, as well as tilted, etc. The control is released at the new position to again hold the platform rigidly in place.

The joints 62, 64 in the foregoing embodiments are simply right angle elbow arrangements (see FIGS. 5–7) with line 101 being arranged to pass through the respective rotational couplings 66 along the centers of their rotation axes. This requires that line 101 be guided through variable bends in two perpendicular planes. According to the alternative embodiment of FIGS. 11 and 12, and a further inventive aspect, a joint with an offset profile can be provided instead of a simple elbow. This offset arrangement has a reduced tendency to kink line 101, and has the further advantage that it enables adjacent articulated connecting arms 22 to be turned back relative to one another, e.g., by 180°. Thus, support arm 20 can be provided with two or more articulated arms that can be extended or folded back over a larger range between proximal end 182 and a chosen position of distal end 184. The cable guides 164 are disposed in a hub arrangement wherein the cable is diverted laterally from the longitudinal axis of each adjacent connecting arm 22, and the cable path bends smoothly to pass through the center or rotational axis of each rotational coupling 66. The stub portion 237 of at least one side of the laterally displaced joint in this embodiment follows a curve that offsets the next adjacent connecting arm to permit the joint to be turned back. More particularly, the axis of the connecting arm coupled to the offset stub portion 237 does not intersect the joint rotation axis and instead is offset by at least the width of the connecting arm, permitting the two adjacent connecting arms to be oriented substantially parallel to one another. This arrangement provides a large positional span but is particularly compact. For example, the span of a keyboard support can be sufficient to enable the keyboard to be used by a person who is either sitting or standing, and the offset joint arrangement still is compactly storable under the desk top or other base structure 30.

The invention is advantageously applied to a movable keyboard support, but also can support or position other devices. FIG. 13 illustrates a platform adapted for supporting a keyboard. Platform 50 has attached panel 51, to which lever 102 is mounted, in this case the lever being formed by caliper 110. A movable shelf 52 can be slidably extended laterally to support a pointing device (e.g., mouse or trackball) or the like, in close proximity to the keyboard. As another possibility, a mouse shelf can be mounted on a rod affixed by a thumbscrew arrangement (not shown) to one of the slots in platform 50.

Other features, such as structures for attaching to or abutting against the keyboard (not shown in FIG. 13), wrist supports 53 and the like can be included. Apart from keyboards, the device is useful for supporting electronic interface devices such as laptop computers, parts of such devices such as display monitors or the like, writing or work surfaces, lmps, receptacles for tools or supplies, and devices in general that may be desired for positioning at varying locations and orientations.

FIG. 13 shows the support platform without its associated distal joint 67. FIG. 14 is a bottom plan view of the platform with the addition of joint 67, which together with the rotational coupling 55 in platform 50 provides a connection having three mutually perpendicular rotation axes.

Figure 15:
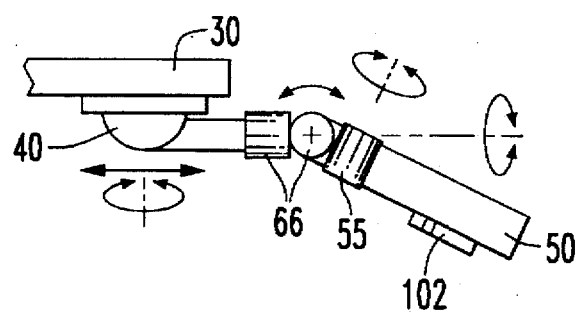
FIG. 15 is a side elevation view of an alternative embodiment having a short connecting arm, as appropriate for tilt adjustment.
Figure 16:
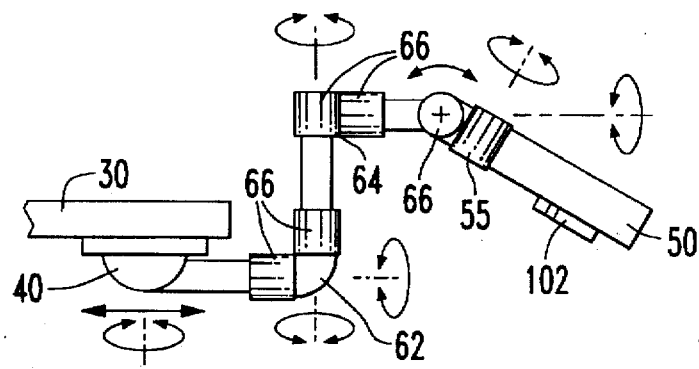
FIG. 16 is a side elevation view of a further alternative embodiment having a universal joint associated with the base element.
Figure 17:
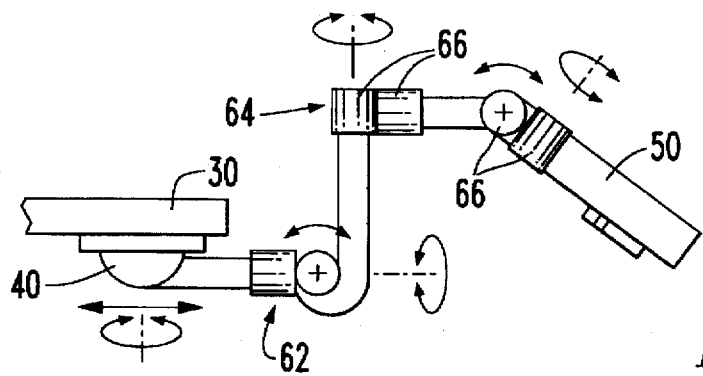
FIG. 17 is a side elevation view of an alternative embodiment having two relatively longer articulated connecting arms and an offset joint.
Figure 18:
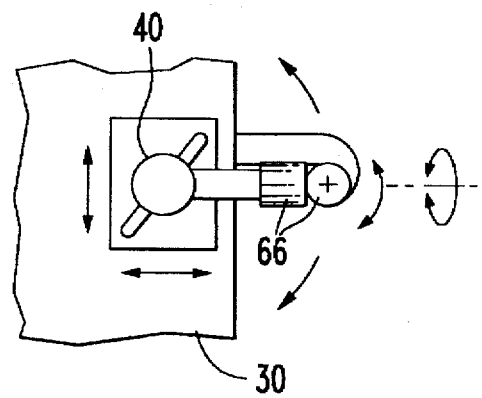
FIG. 18 is a top plan view of a preferred embodiment of a support configured as in FIG. 17, shown folded back on the offset joint.

FIGS. 15–17 illustrate the versatility of several alternative embodiments characterized by different spans of positioning possibilities due to different lengths and configurations of the connecting arm structures used. In FIG. 15, a short connecting arm is provided, as appropriate for tilt adjustment without the capability of moving the support far from the desk top or other base structure 30. FIG. 16 shows an alternative embodiment having a universal joint associated with the base element, providing additional span. FIG. 17 shows an alternative embodiment having two relatively long articulated connecting arms, which provide a large span of potential positions. The embodiment of FIG. 17 preferably provides a sufficient extension to enable the support platform to be conveniently positioned for a person who is either standing or sitting, and according to the foregoing locking technique is fixed rigidly where placed. This embodiment preferably uses the offset joint of FIGS. 11 and 12, as apparent from FIGS. 17 and 18. This long-extension embodiment is also appropriate for support arms on relatively low bases, for example attached to a short floor pedestal or to a weighted mobile pedestal from which the support arm is free standing.

Figure 19:
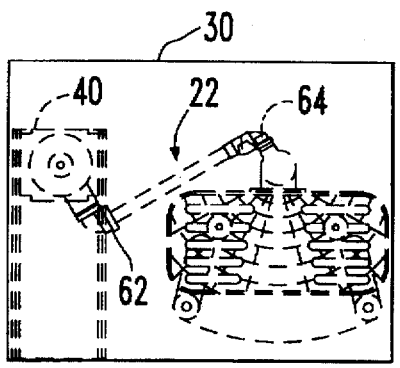
FIG. 19 is a plan view illustrating an embodiment of the invention configured for supporting a keyboard, laptop computer or the like, shown stowed under a counter.
Figure 20:
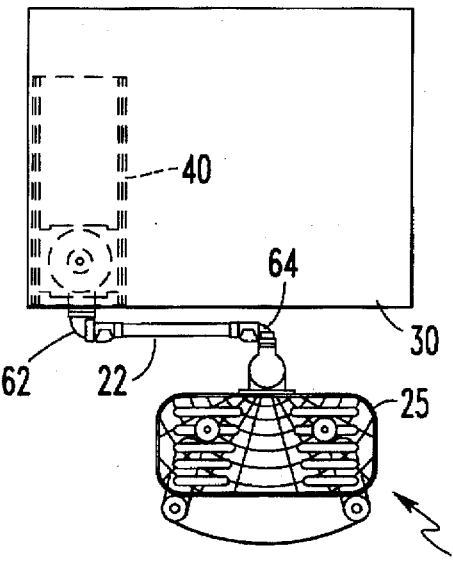
FIG. 20 is a plan view showing the device according to FIG. 19 in a close working position.
Figure 21:
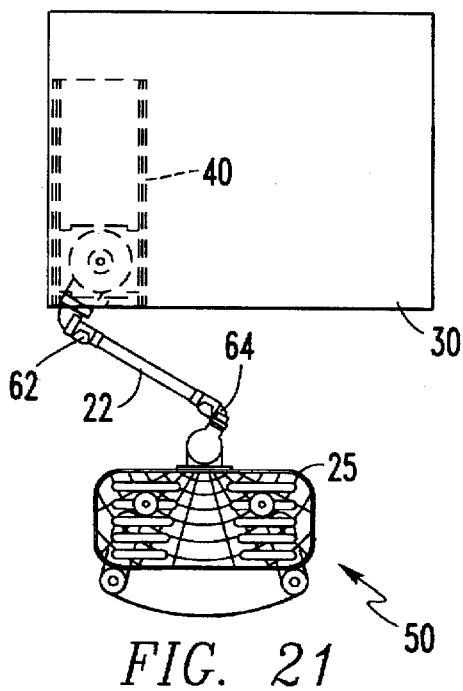
FIG. 21 is a plan view thereof showing the device in an extended working position.
Figure 22:
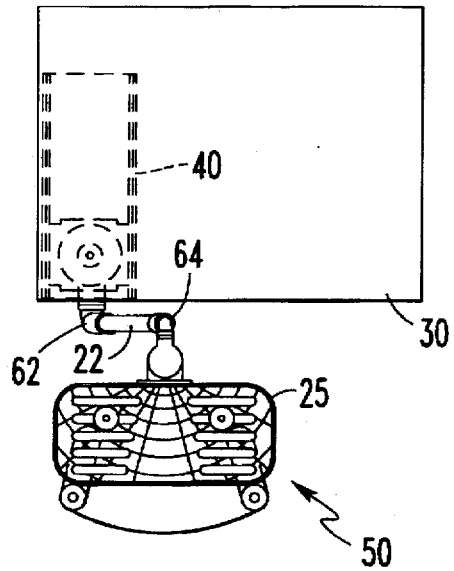
FIG. 22 is a plan view thereof showing the device in a raised position.

FIGS. 19–23 illustrate a preferred embodiment of the invention as configured especially for supporting a keyboard, laptop computer or the like. In FIG. 19 the device is shown stowed under a counter. The support platform 50 can be moved to a working position close by the edge of the counter as in FIG. 20, an extended working position farther from the counter as in FIG. 21, or a raised position as in FIGS. 22 and 23.

Figure 24:
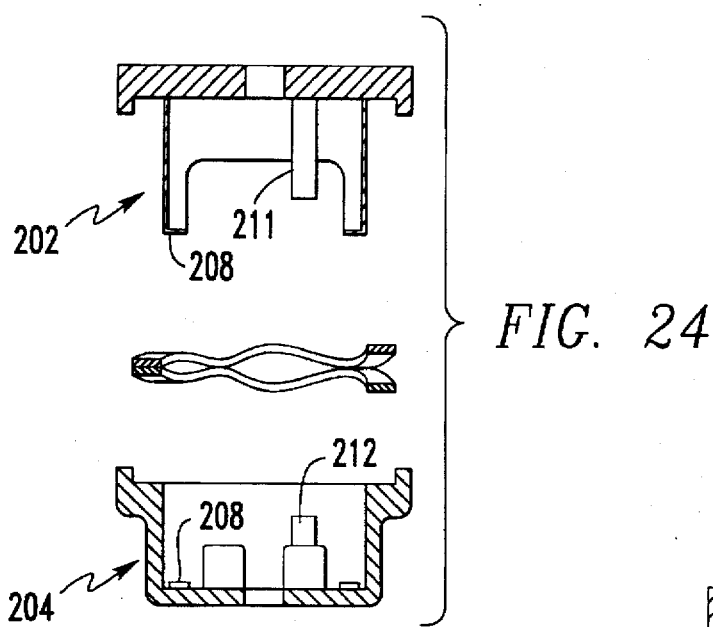
FIG. 24 is an exploded view showing a preferred controllable joint for use in the embodiment of FIGS. 19–23.
Figure 25:
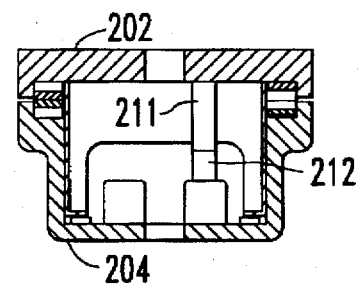
FIG. 25 is a section view through an assembled joint according to FIG. 24.

FIG. 24 is an exploded view showing an embodiment of a controllable joint for use in the embodiment of FIGS. 19–23, and FIG. 25 is a section through the joint as assembled. In this arrangement, the male end or fitting 202 and the female end or fitting 204 can be provided integrally on the ends of members coupled at the joint, or can be attached thereto. A plurality of complementary pins, ridges or the like are provided in fittings 202, 204 along an annulus 208. Axially extending-abutments 211, 212 come into contact with rotation of the fittings 202, 204, as seen in FIG. 25, such that the joint cannot turn continuously through more than 360°. Preferably, abutments 211, 212 are placed in a position to stop rotation of the proximal joint (between the base member stub and the next connecting arm) near the top of its rotation, for example as shown in FIG. 2).

Figure 26:
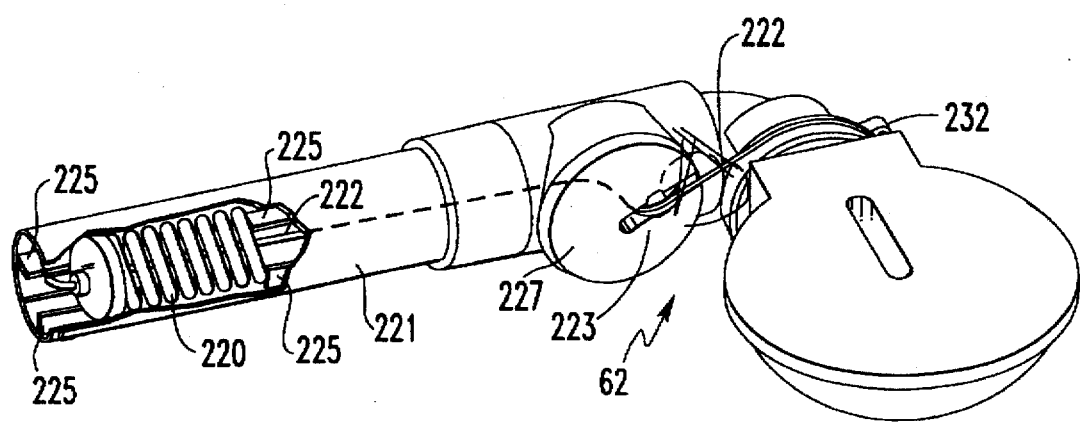
FIG. 26 is a partial perspective view illustrating a compression spring counterbalance arrangement according to the invention.
Figure 27:
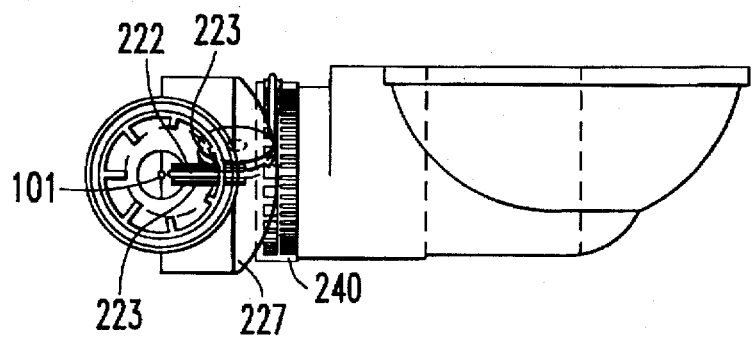
FIG. 27 is a top plan view of the embodiment according to FIG. 26, partly in phantom to show the passage of the counterbalance coupling over pulleys.

FIGS. 26–29 show an embodiment wherein a counterbalance spring 220 is disposed inside a connecting arm or sleeve 221 coupled by proximal joint 62 to the base member stub. Spring 220 is a compression spring attached to a cable 222 passed around two pulleys 223 or the like to extend into the plane of the joint 62 including the base member stub. Cable 222 is attached tangentially to a fixed point on the proximal side of joint 62, and thus tension is applied to cable 222 as sleeve 221 rotates downwardly on joint 62, further compressing spring 220 and offsetting part of the weight of the support. As shown in FIG. 27, viewing endwise along sleeve 221, a plurality of splines 225 extend inwardly of sleeve 221 to support spring 220 laterally. Splines 225 hold spring 220 and cable 222 off center in sleeve 221, to avoid interference between counterbalance cable 222 and control cable 101, which runs along the axial center of sleeve 221 so as to pass centrally through the rotational joints.

Splines 225 can extend further radially inwardly at the proximal end of spring 220 as shown in FIG. 26, providing a longitudinal abutment against which spring 220 can be compressed. Alternatively, an inner sleeve, washer or the like (not shown) can provide a longitudinal abutment at the proximal end of spring 220.

Figure 28:
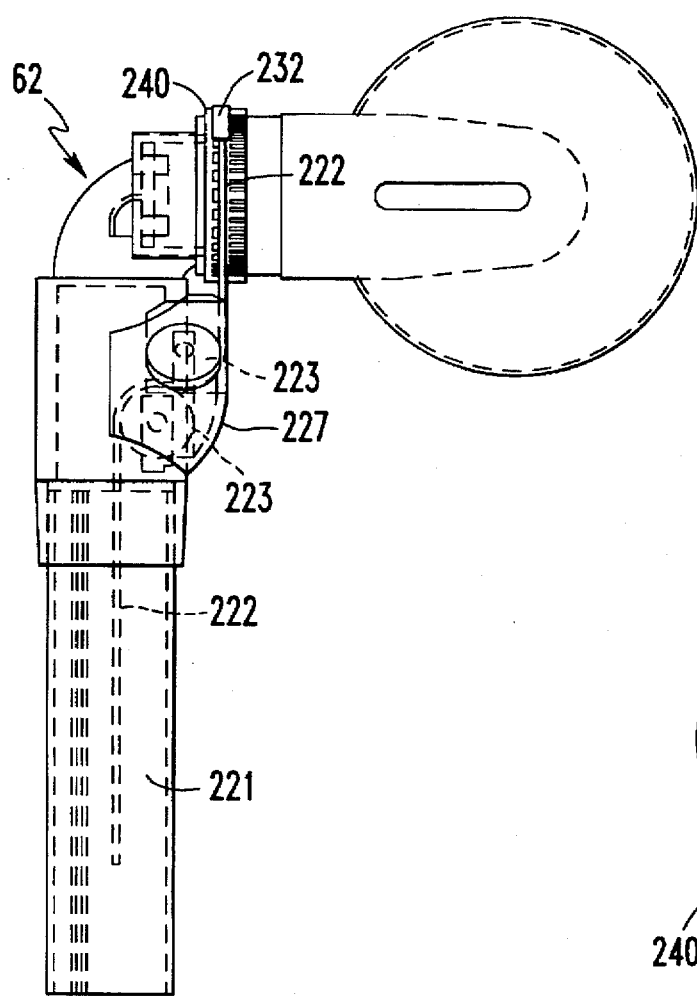
FIG. 28 elevation view taken from the left in FIG. 27.

With further reference to FIGS. 27 and 28, the two pulleys 223 each have sheaves on a shaft received in slots formed in sleeve 221 or in an insert therein. The inner pulley is held in its slot by cable 222. The outer pulley can be mounted in a cap member 227 that is aligned as required for cable 222 to extend tangentially to an attachment point 232 on the joint 62, spaced radially from the axis of rotation of joint 62. Cap member 227 can be removable and replaceable in the opposite orientation for switching the support from a left handed normal position of sleeve 221 to a right handed one.

Figure 29:
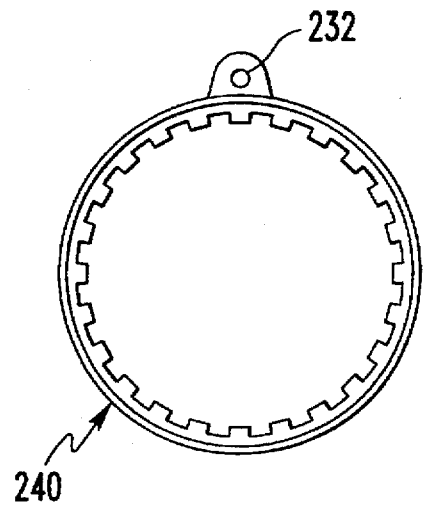
FIG. 29 is an elevation view taken from below in FIG. 27, showing the relationship of the joint locking cable and the counterbalance coupling lines.

As shown in FIGS. 26 and 29, the attachment of counterbalance cable 222 to the proximal side of joint 62 can be adjustably fixed using a splined ring 240 having attachment point 232 on a protruding ear. Ring 240 fits on complementary splines on the outer surface of the proximal side of joint 62, whereby ring 240 is not rotatable and fixes the position of point 232. However, when tension is released from counterbalance cable 222, splined ring 240 can be displaced axially to disengage ring 240 from joint 62. Ring 240 can then be rotated and re-engaged with joint 62 at a different angle to apply more or less tension on cable 222 and counterbalance spring 220.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A support arm for movably positioning a surface relative to a base structure, comprising:

a base member attachable to the base structure;

a platform defining the surface;

at least one connecting arm disposed between the base member and the platform;

at least one joint coupling the connecting arm to one of the base member and the platform, wherein said at least one joint is rotatable on a substantially horizontal axis, the joint having rotatable couplings between the connecting arm and said one of the base member and the platform along two mutually perpendicular axes, thereby forming a universal joint;

locking means engaging the rotatable couplings for maintaining an angular relationship between the connecting arm and said one of the base member and the platform for both said two mutually perpendicular axes, the locking means having rotational engagement surfaces facing one another axially along each of the two axes and means for applying tension to draw the rotational engagement surfaces axially together, and for releasing said tension to allow relative rotation between the connecting arm and said one of the base member and the platform;

resilient means in at least one of the joints mounted to urge the rotational engagement surfaces axially apart, the resilient means being normally loaded by said means for applying tension such that the rotational engagement surfaces come into contact, and unloaded upon easing of the tension such that the couplings are free to rotate;

control means for simultaneously releasing the locking means in both said two mutually perpendicular axes; and a counterbalance spring disposed inside said connecting arm and coupled by a counterbalance cable which is passed around at least one pulley housed in said connecting arm and extends tangentially to an attachment point spaced from the horizontal axis and provided on a fitting mountable over a range of positions on said joint such that rotation of the joint applies varying tension to the cable, and wherein the spring resists said tension to offset at least part of a weight of the support arm.

2. The support arm according to claim 1 wherein a second pulley is mounted in a cap member aligned tangentially to said attachment point and spaced radially from the axis of rotation of said joint.

3. The support arm according to claim 2 wherein said cap member is removable and replaceable in either a left-handed orientation or a right-handed orientation.

4. The support arm according to claim 1 wherein a plurality of splines extend inwardly of said connecting arm to laterally support said counterbalance spring.

5. The support arm according to claim 4 wherein said splines hold said counterbalance spring and said counterbalance cable off center in said connecting arm to avoid interference between said counterbalance cable and said means for applying tension.

6. The support arm according to claim 5 wherein said means for applying tension comprises a control cable which runs along the axial center of said connecting arm so as to pass centrally through said rotational joints.

7. The support arm according to claim 6 wherein said counterbalance spring comprises a compression spring.

* * * * *